(12) United States Patent
Sharma

(10) Patent No.: US 11,068,505 B2
(45) Date of Patent: *Jul. 20, 2021

(54) SYSTEM AND METHOD FOR GENERATING AND MERGING ACTIVITY-ENTRY REPORTS UTILIZING ACTIVITY-ENTRY HIERARCHY AND HIERARCHICAL INFORMATION OF THE ACTIVITY-ENTRIES

(71) Applicant: Pankaj Sharma, Centreville, VA (US)

(72) Inventor: Pankaj Sharma, Centreville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,061

(22) Filed: Mar. 16, 2020

(65) Prior Publication Data

US 2020/0272639 A1 Aug. 27, 2020

Related U.S. Application Data

(63) Continuation of application No. 15/952,009, filed on Apr. 12, 2018, now Pat. No. 10,592,533, which is a continuation of application No. 14/558,672, filed on Dec. 2, 2014, now Pat. No. 9,954,911.

(60) Provisional application No. 61/910,512, filed on Dec. 2, 2013.

(51) Int. Cl.
*G06F 3/048* (2013.01)
*G06F 16/28* (2019.01)
*G06F 3/0486* (2013.01)
*G06F 3/0484* (2013.01)

(52) U.S. Cl.
CPC .......... *G06F 16/282* (2019.01); *G06F 3/0486* (2013.01); *G06F 3/04842* (2013.01)

(58) Field of Classification Search
CPC ... G06F 16/282; G06F 3/04842; G06F 3/0486
See application file for complete search history.

(56) References Cited

U.S. PATENT DOCUMENTS

| | | | |
|---|---|---|---|
| 7,113,933 B1 * | 9/2006 | Imholte | G06Q 10/06 707/E17.005 |
| 7,197,502 B2 * | 3/2007 | Feinsmith | G06Q 10/10 |
| 9,501,751 B1 * | 11/2016 | Holler | G06F 8/71 |
| 2007/0038494 A1 * | 2/2007 | Kreitzberg | G06Q 10/10 358/1.9 |
| 2014/0304618 A1 * | 10/2014 | Carriero | H04L 51/08 715/753 |

* cited by examiner

*Primary Examiner* — Mahelet Shiberou
(74) *Attorney, Agent, or Firm* — Attentive Law; Paul Ratcliffe

(57) ABSTRACT

The invention provides for a system and method for activity-entry reporting and activity-entry report generation by utilizing a drag and drop mechanism that allows users to merge submitted activities in order to generate new activities. These activities are contained within activity reports that can be modified and merged by other users in an effort to develop combined activity reports that maintain the traceability of the merged activities.

11 Claims, 3 Drawing Sheets

SYSTEM AND METHOD FOR GENERATING AND MERGING ACTIVITY-ENTRY REPORTS UTILIZING ACTIVITY-ENTRY HIERARCHY AND HIERARCHICAL INFORMATION OF THE ACTIVITY-ENTRIES

RELATED APPLICATION

This application claims priority to U.S. Continuation patent application Ser. No. 15/952,009 filed on Apr. 12, 2018 entitled "System And Method For Generating And Merging Activity-Entry Reports Utilizing Activity-Entry Hierarchy And Hierarchical Information Of The Activity-Entries", which claims priority to U.S. patent application Ser. No. 14/558,672 filed on Dec. 2, 2014 entitled "System And Method For Generating And Merging Activity-Entry Reports Utilizing Activity-Entry Hierarchy And Hierarchical Information Of The Activity-Entries", which claims priority to U.S. Provisional Application 61/910,512 filed on Dec. 2, 2013, entitled "System And Method For Generating And Merging Activity Entry Reports Utilizing Activity-Entry Hierarchy And Hierarchical Information Of The Activity-Entries", the entirety of each are incorporated herein.

BACKGROUND OF INVENTION

1. Field of Invention

The present invention relates generally to the field of enterprise activity reporting and report generation. More specifically, the invention relates to software and related computer programs or applications which can generate activity reports by creating new activity-entries, merging previously created activity-entries and reports, while maintaining activity-entry hierarchy. The merging of the activity-entries can be achieved through various user interface coded features including the system's drag and drop functionality, selecting multiple activity-entries and merging or any other technical implementation.

2. Description of the Related Art

Presently, current software systems allow one or more users to enter work activities, track actions, track time, such as billable time, against a client or matter. Reports and invoices can be generated through these systems and they will compile the time of all users who recorded time for a given client or matter. However, these systems are not used to report activities, compile or merge activity-entries amongst several managers who can select and choose which tasks and activity-entries to report and generate reports which can then be moved up a hierarchy to another user who can merge and manage multiple reports from multiple managers. Therefore, what is needed is an activity-entry recording and reporting software and system which enables users to record activity-entries, import activity entries from other users, merge multiple activity-entries, record time against those activity-entries and allow manager users to consolidate, approve, merge, and create reports of activities across many users.

SUMMARY OF INVENTION

This summary of the invention is provided to introduce concepts in a simplified form that are further described in the detailed description of the invention. This summary is not intended to identify key or essential inventive concepts of the claimed subject.

The present invention provides a software based system and method for activity reporting and report generation while maintaining the hierarchy of the activity-entries. The report generation software of the system includes a merge capability which enables users to merge via drag and drop function; import and merge function; entry or activity selection and merge; as well as merge all or merge by selected criteria. The system allows for users to create activity-entries (hereafter "activities") that describe their activities, accomplishments, and status updates on a given project segmented by time such as minutes, hours, days, or weeks. The software of the system allows these activities to be submitted by the user and available to the next level supervisor who can approve and then create his/her own activity status report containing new activities that were generated by merging the submitted activities of selected users through the utilization of the system's merge functionality. Additionally, the system enables the supervisor to create new activities of his own. Traceability of any activities submitted by users of the system will be maintained by the system and can be quickly viewed by any system user with proper authorization and access level. Traceability is similar to version control and allows any activity which is merged or copied to retain information about the user that created the activity (or activity entry). The software and system also maintains the hierarchy of the activities. Merged activities at any level can be traced back to original activity-entries. The system also stores or saves the attributes of each activity-entry like creation date, user information, task details, project details or any other information linked to the activity-entry.

Further, the present invention provides an activity merging and reporting system comprising: at least one processor device connected to at least one memory device wherein the processor is remotely accessible by a first user and a second user; the processor device having at least one software application resident thereon, wherein the software application is configured to: provide a graphical interface enabling the first user and the second user to enter information relevant to an activity; wherein the system stores, in a database associated with the processor, activity information and user information including the first users role and hierarchy level and the second users role and hierarchy level; and the graphical interface enabling a third user to merge activities of the first user with activities of the second user to generate a merged activity; wherein the merged activity maintains the activity information attributed to each user, the user information, and the hierarchy information and stores the merged activity information in the database.

Still further, the system of the present invention can be configured, upon entry of the activity information by the first user or second user, to prompt the third user to approve the activity reports or information. The system also allows the third user to enter activity information related to their activities. The system also allows for the generation of reports of the merged activities, with or without activities which were not merged, and such reports may be digital files such as a PDF or CSV file. The merge function may be initiated by a drag and drop function accessible by the third user through the graphical user interface.

The present invention also provides a method for generating and merging activity information comprising the steps of: accessing a processor based system by a first user; wherein the first user enters information through a graphical user interface software based system on at least one activity;

the system then saves the activity information, the user information, and the hierarchy level of the first user in a database associated with the processor; accessing the processor based system by a second user; wherein the second user enters information on the at least one activity; the system then saves the activity information, the user information, and the hierarchy level of the second user in the database; accessing the processor based system by a third user who merges the activity information of the first user with the activity information of the second user to generate a merged activity; wherein the merged activity maintains the activity information attributed to each user, the user information, and the hierarchy information and saves the merged activity information in the database. The method further includes the step of having the third user approve of the activity information by the first user or second user prior to merging. The method further including the step of having the third user enter information on at least one activity and saving the activity information, the user information, and the hierarchy level of the third user in a database associated with the processor system. The method further including the step of generating the merged activities into a report in the form of a digital file. The method further including the step of initiating the merge function upon use of a drag and drop function accessible by the third user through the graphical user interface.

The system of the present invention can be accessed through a dynamic secure and password-protected portal via a server, such as a private server, or a cloud-based server. The system's software and applications run on a processor which could be a wearable computing device (i.e., google glass, watches etc.), portable tablet, smartphone or personal computer.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Particular embodiments of the present invention will now be described in greater detail with reference to the figures.

Figure 1:
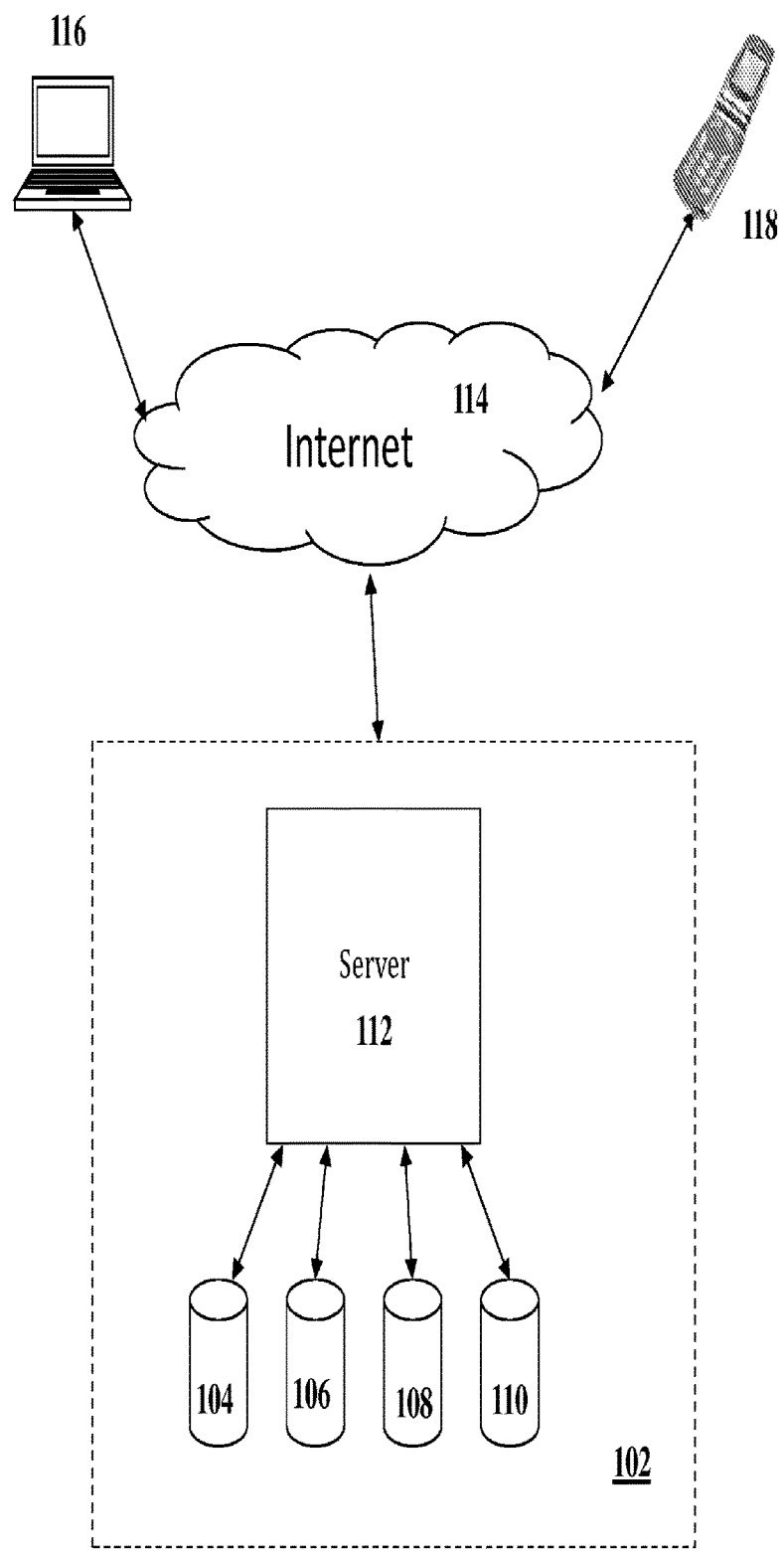
FIG. 1 depicts a system diagram of an exemplary architecture implementation of the present invention.

As shown in FIG. 1, the present invention in an exemplary embodiment provides for a main system 102 which comprises of one or more servers 112 connected to one or more databases 104, 106, 108, 110. The system 102 may be installed locally, in a wide area network, and in cloud-based architecture.

Various applications, software, and programs reside on the one or more servers 112 that allow various users to access the system's interface using their laptop, personal computer, smartphone, wearable computing device or tablet, 116, 118. The personal computing devices 116, 118 may access the system 102 remotely via an internet, a Wi-Fi connection, or it may connect via a mobile telecommunication network. Further, the personal computing devices 116, 118 may have an application downloaded and deployed on the device (such as a mobile application). These applications, software, and programs may be local to the network or device, web-based, or some combination. User's may access the system 102 through the internet 114, local network, wide network, or telecommunication network to interact with the systems various applications and services.

Figure 2:
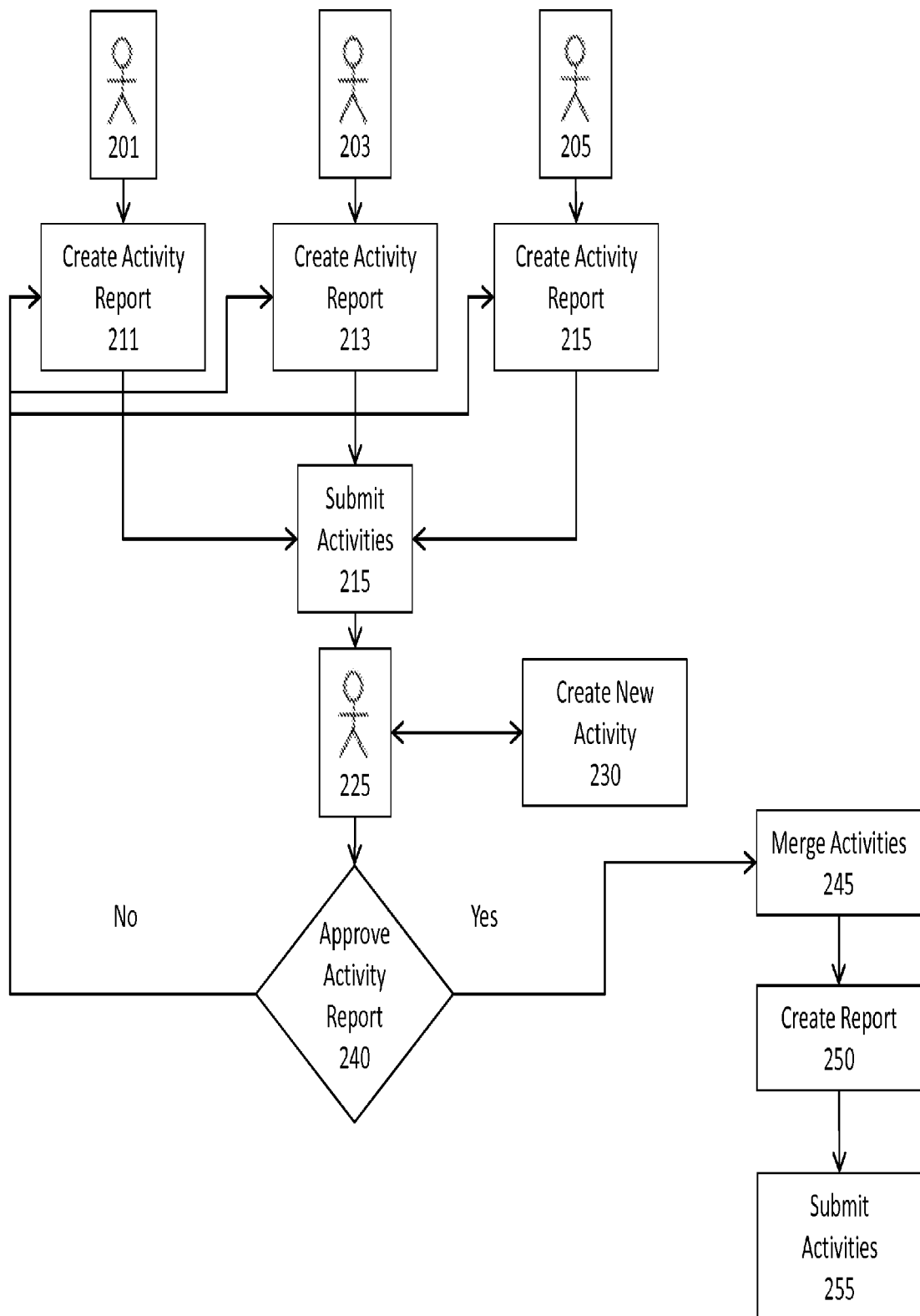
FIG. 2 is a workflow diagram showing the process of the present invention by which activities can be created and activity reports can be generated.

As shown in FIG. 2, the present invention provides method and system that allows for the creation of activities and activity reports by system users 201, 203, 205, 225. The system of the present invention also allows for the creation of new activities generated by way of merging other user's activities though the system's drag and drop, import and merge, or other mechanism. The end result of the merging process is a combined activity report that consists of activities entered into the system by at least one user.

The present invention allows for users 201, 203, 205, 225 to access the system and log their general activities, activities for a specific project or tasks within the system's database. Once within the system, the user 201, 203, 205, 225 of the present invention can create new activity reports 211, 213, 215 and modify existing activity reports. These activity reports contain a user's entered periodic activities. These periodic activities (hereinafter referred to as "activities") that are entered into the system by a user may be specific tasks the user worked on, the status of those tasks, accomplishments completed, and milestones reached for a specific project.

By way of example, User 201 could be a consultant that is developing software code for a client's website. During one day of the workweek, he may work on a variety of assigned tasks, such as building a website database, developing the site's login capability, and developing a patch for a security concern. Throughout the day or at the end of the day, the user 201 will log onto the system and create an activity entry for each of the tasks that he worked on during the day. Each activity will also be designated a status, such a pending, incomplete, complete, abandoned, and/or late. These activities will be compiled in an activity report 211, 213, 215 generated by the user.

Once a user 201, 203, 205 completes his activity report, he submits the activity report 215 to his next level supervisor user 225 for his approval 240. If the report is approved (step 240), the supervisor user 225 will merge (step 245) the user's activity report 211, 213, 215 with those of other users working on the same or different projects. If, in step 240, the activity report is not approved, then the supervisor 225 will require the user 201, 203, 205 to modify the report accordingly until approval (240) is granted by the supervisor 225.

The supervisor 225 can merge 245 the submitted activity entries by utilizing the system's merge functions. The software of the present invention provides one or more merge functions which include: a drag and drop function; an import and merge function; and a select and merge function in order to generate a combined activity report. When the submitted activities of other users are merged, new activities are created utilizing the information contained in the submitted activities.

The system creates a new merged activity by combining the content of the other user's activities. The system maintains the traceability among the merged activities.

The merging process is accomplished by the supervisor user first viewing another user's submitted activity report and selecting a specific activity entry or the entire activity report by "grabbing it" then dragging it into a new activity report or selecting the activity (via a checkbox, radio button or other implementation) and pressing the "merge" button. This process can be repeated by selecting, grabbing, and dragging other users' activity entries or activity reports into the supervisor's new activity report, thus generating a combined activity report. The ability of the system to generate combined activity report allows for the users' submitted reports to be easily merged and accessible via one report with the same formatting.

Additionally, the supervisor 225 can also create his own activities 230 which can be combined in an activity report 250. These can be activities that he personally worked on, modifications to submitted activities other users worked on, or activities worked on by other users but never submitted to the supervisor for his approval.

Once the supervisor's combined activity report 250 is completed, it can then be submitted 255 to the next level supervisor user for his review and approval. This higher-level supervisor user can repeat the process by utilizing the systems merge capabilities including the drag and drop capabilities and merge submitted periodic activities and activity reports from the lowest level users and lower level supervisor users alike into a new combined activity report. This process is repeated until it reaches the highest supervisor who then finalizes the report and submits 255 the report to the client.

Figure 3:
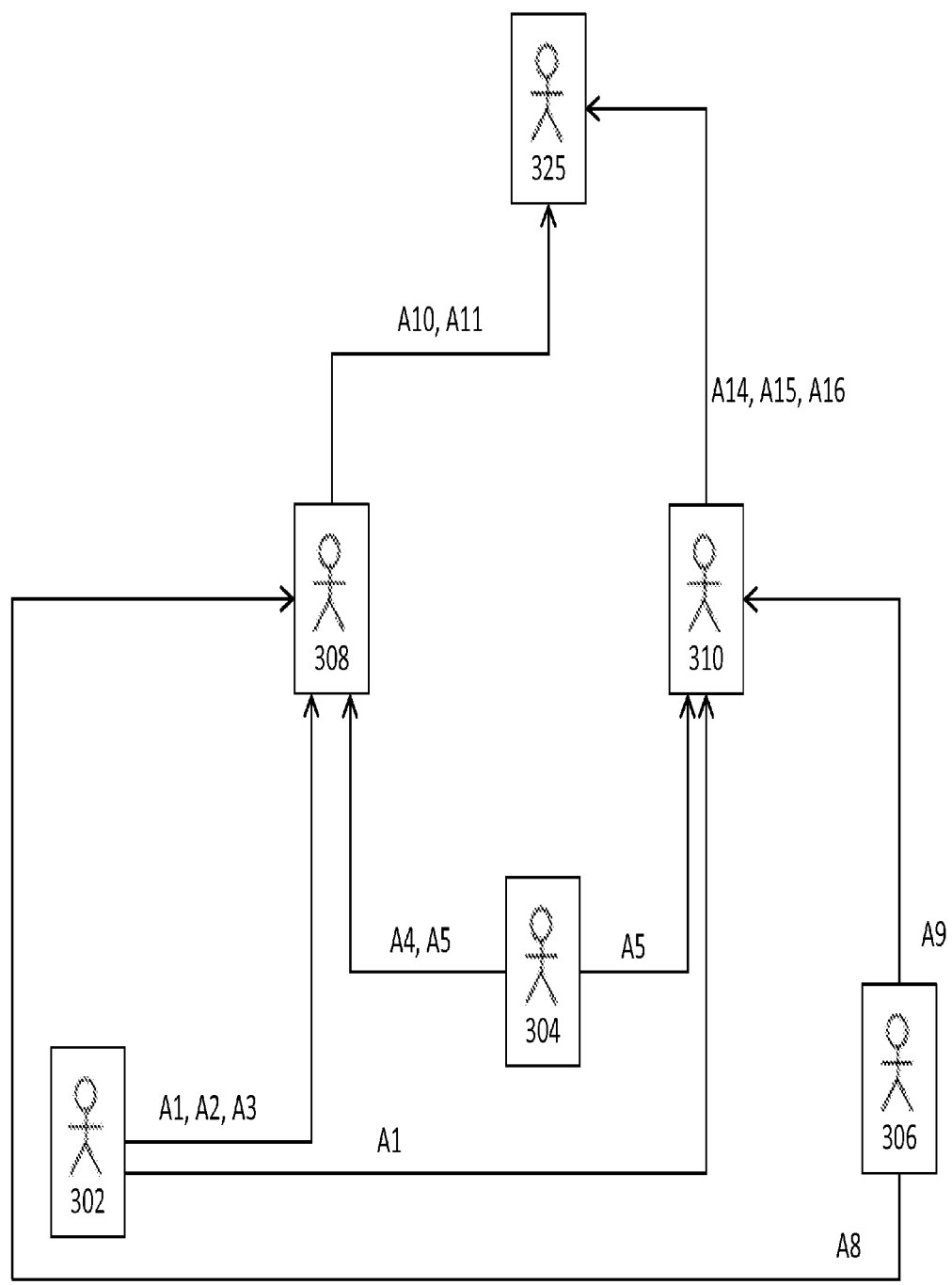
FIG. 3 is a workflow diagram showing the process by which new activity reports can be created by merging previously submitted activities by other users in an effort to develop combined activity reports.

The system's ability to merge several activities to develop new activities displayed in combined activity reports is further depicted in FIG. 3. Initially, lower level users 302, 304, 306 create separate activity reports that contain three periodic activity entries each: User 302 (A1, A2, and A3), User 304 (A4, A5, A6), and User 306 (A7, A9, A10). These reports containing the periodic activity entries are submitted to their supervisors 308, 310. User 308 creates a combined activity report that includes four periodic activity entries (A10, A11, A12, A13) that were generated by merging the selected activities of User A, User B, and User C. For example, User 308's A10 activity was created by merging User 302's A1 and A2 activities. Similarly, User 308's A13 activity was created by merging User 302's A3 activity, User 304's A5 activity, and User 306's A8 activity.

User 310 also performs that same actions and creates a combined activity report that includes activities that were generated by merging User 302, User 304, and User 306's activities.

Once User 308 and User 310's activity reports are completed, it is then submitted to User 325 who then develops his own combined activity report with new activities that were generated by merging User 308 and User 310's activities. For example, User 325 might have two activities (A17, A18) where A17 is generated by merging User 308's A10 activity with User 310's A14 activity. Activity A18 might be generated by combining User 308's A10, A11 activities with User 310's A14, A15, and A16 activities.

Regarding the software, as previously mentioned, the system operating on the one or more servers 112 and interacting with the one or more databases 104, 106, 108, 110. The software operates to interact with the databases and the stored activities and the stored attributes of each activity. Upon receipt of a merge command, the system identifies the appropriate activities within the database and creates a new combined activity. However, the new combined activity merges and retains the activities and related activity descriptions and times, the user identification, and the hierarchy of each user in the activity report. The combined activity is stored in the database as a new activity with structured data for the activities, users, and hierarchy.

Throughout the process, the present invention maintains the traceability of the activity entries after they are merged into the combined activity reports. System maintains the sanctity of each activity-entry created by any user. At the time of merge, the system creates a copy of the original activity and copies the content to the new merged activity. The new merged activity is owned by the new user who created the merged activity. System creates a record of the parent-child relationship of the activities at all level. For example, if User X uses an activity of User C, which in turn is used by User Z, the system will be able to trace the connection of user Z's activity to the activity of both User X and User C.

Although the system is ideally suited to enable users to create merged activity reports the system can also be used to collaborate on documents, time reports, billing and invoicing and related tasks. By providing a collaborative tool which can be used by many users which merge capabilities for higher level users to drag and drop documents and collaborative projects can quickly be assembled while maintaining the contributor information at all levels in the project.

It will be recognized by those skilled in the art that changes, or modifications may be made to the above described embodiment without departing from the broad inventive concepts of the invention. It is understood therefore that the invention is not limited to the particular embodiment which is described but is intended to cover all modifications and changes within the scope and spirit of the invention.

I claim:

1. An activity merging reporting system that constitutes a system, the system comprising:
    at least one processor device connected to at least one memory device, the at least one processor is remotely accessible by a first user and a second user, and the at least one memory device including a database associated with the processor;
    the at least one processor device having at least one software application resident thereon, wherein the at least one software application, as implemented by the at least one processor device, is configured to:
    receive first user activity information from a first user, the first user activity information associated with a first user role and a first user hierarchy level in the database; and
    receive second user activity information from a second user, the second user activity information associated a second user role and a second user hierarchy level in the database;
    merge, by the system, the first user activity information and the second user activity information to generate merged activity information;
    generate, by the system analyzing the first user activity information and the second user activity information, a traceability record of the parent-child relationship of the activity between the first user activity information and the second user activity information;
    the merged activity information maintains (a) the association of first user activity information with the first user role and the first user hierarchy level; and (b) the association of the second user activity information with the second user role and the second user hierarchy level;

the merged activity information including the traceability record of the parent child relationship of the activity between the first user activity information and the second user activity information;

the traceability data being separate from association between the first user activity information and the first user; and the system storing the merged activity information in the database.

2. The system of claim 1, wherein a third user is prompted to approve the first user activity information and the second user activity information.

3. The system of claim 1, wherein the system receives third user activity information related to an activity of the third user.

4. The system of claim 1, wherein the first user activity information and the second user activity information are merged, by the system, into a report in the form of a digital file.

5. The system of claim 1, wherein the merge of the first user activity information of the first user with the second user activity information of the second user, to generate merged activity information, constitutes a merge function, and the merge function is initiated by a drag and drop function accessible by a third user through a graphical user interface.

6. A method for generating and merging activity information comprising the steps of:

receiving, by a processor system, a set of first user activity information from a first user wherein the first user activity information includes information on a first user role and a first user hierarchy level;

saving, by the processor system, the first user activity information in a database associated with the processor system;

receiving, by a processor system, a set of second user activity information from a second user wherein the second user activity information includes information on a second user role and a second user hierarchy level;

saving, by the processor system, the second user activity information in the database associated with the processor system;

receiving, by the processor system, a request to merge the first user activity information of the first user with the second user activity information of the second user;

merging, by the processor system, the first user activity information of the first user with the second user activity information of the second user to generate a traceability record;

generating the traceability record by the processor system analyzing the first user activity information and the second user activity information and determining the parent-child relationship of each related activity between the first user activity information and the second user activity information;

generating by the processor system analyzing the first user activity information and the second user activity information, a traceability record of the parent-child relationship of the activity between the first user activity information and the second user activity information;

wherein the merged activity information maintains (a) the association of first user activity information with the first user role and the first user hierarchy level; and (b) the association of the second user activity information with the second user role and the second user hierarchy level;

wherein the merged activity information includes the traceability record of the parent child relationship of the activity between the first user activity information and the second user activity information;

wherein the traceability data is separate from association between the first user activity information and the first user; and storing, by the processor system, the merged activity information in the database.

7. The method of claim 6, further including the step of the processor system receiving an approval from a third user of the first user activity information and the second user activity information prior to merging the first user activity information and the second user activity information.

8. The method of claim 6, further including the step of the processor system receiving third user activity information on at the least one activity from a third user, and saving the third user activity information wherein the third user information includes third user hierarchy level of the third user.

9. The method of claim 6, further including the step of generating the merged activity information into a report in the form of a digital file.

10. The method of claim 6, wherein the first user information further including first user role information, and the second user information further including second user role information; and associating, by the processor system, the first user role information with the first user activity information used to generate the merged activity information; and associating, the second user role information with the second user activity information used to generate the merged activity information.

11. The method of claim 6, wherein the first user information further includes first time data associated with the first user activity information, and the second user information further includes second time data associated with the second user activity information.

* * * * *